Patented July 7, 1931

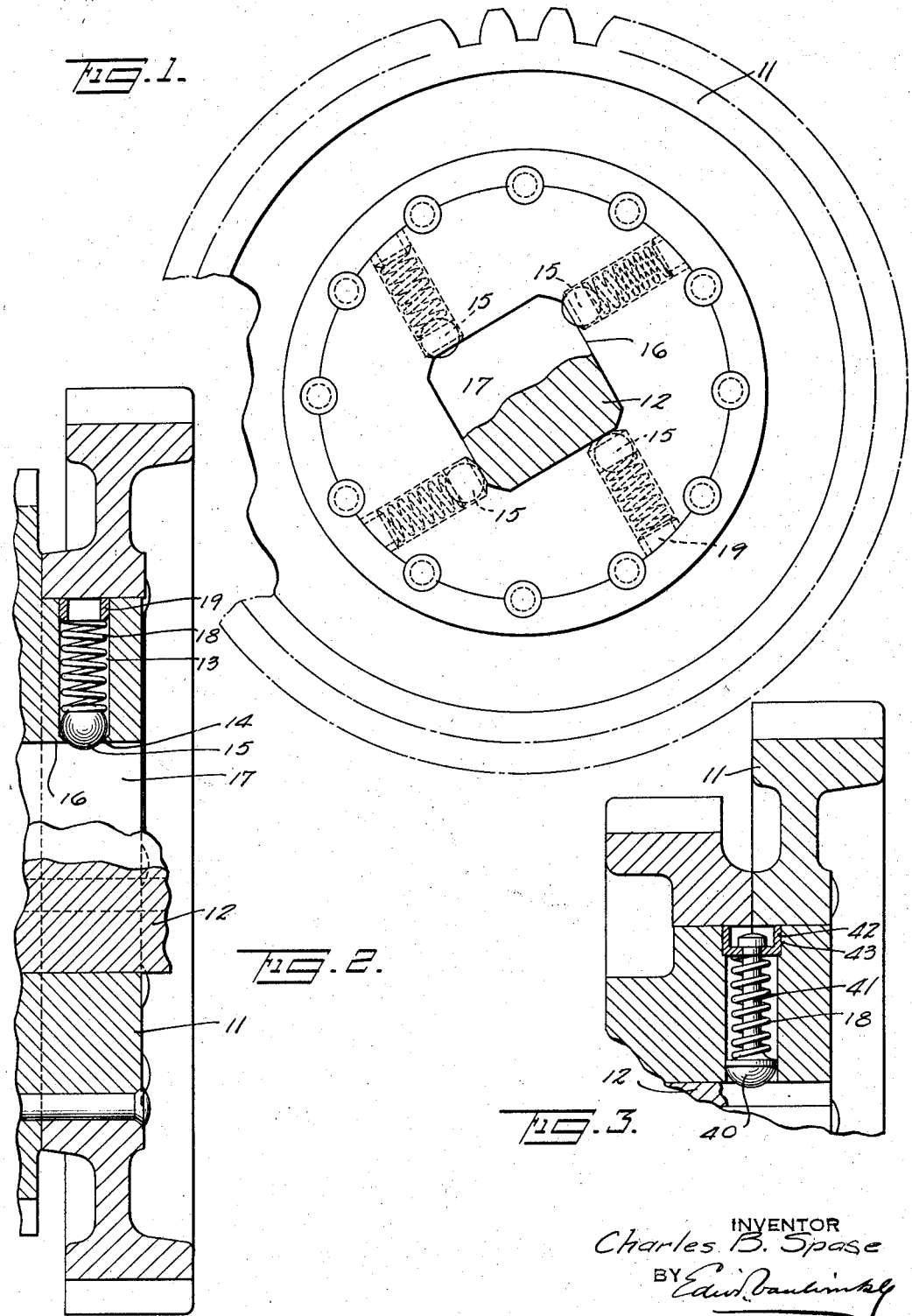

1,813,209

UNITED STATES PATENT OFFICE

CHARLES BEERS SPASE, OF SYRACUSE, NEW YORK

ANTIRATTLE SLIDING GEAR ASSEMBLY

Application filed February 11, 1930. Serial No. 427,472.

My invention relates to that class of gear wheels which are designed to slide on a shaft or spline in power transmissions especially those used in automobiles and has for its object to produce an assembly that will eliminate certain noises.

When motor builders, in an attempt to speed acceleration of the motor car, began to lighten the engine fly wheels and increased the compression without taking care of the crank-shaft deflection and in some instances even lightened the crank-shaft construction, they found that certain troublesome noises were produced at certain engine and consequent car speeds. These noises were produced by tortional vibration in the crank-shaft which, being transmitted to the transmission, caused the gears therein to rattle or, by these same vibrations synchronize with similar ones in the transmission and other parts rearward of the car. These noises vary from being scarcely audible in some cars to very objectionable noises in others.

There have been many attempts to smooth out the tortional or power impulses as communicated to the transmission and final drive, such as the prevalent use of rubber discs installed in clutches whereby the torque from the engine is transmitted through rubber; but this does not satisfactorily eliminate the noise.

I have discovered that the cause of much of the noise in the transmission is due to the true fly wheel effort of the sliding gears being interrupted by the irregular vibration, from the motor and other exterior mechanisms, which govern the shaft with which these gears rotate; this condition is aggravated by the looseness of fit between these gears and the shaft necessary because these gears must move longitudinally on the shaft.

To overcome this I provide all the sliding gears with a poppet, actuated by a spring, in constant forced contact with the shaft so that the gear is forced thereby to rotate exactly as the shaft instead of as a true fly wheel. This regulation eliminates the noise as outlined herein.

My invention consists of the improvements which will be hereinafter fully set forth and more particularly pointed out in the claims.

In the drawings:

Figure 1 is a side elevation of a sliding gear, in part section, embodying my assembly.

Figure 2 is a section along the line 2—2—2, Figure 1.

Figure 3 is a section of a modified form of my poppet which I employ.

For the purpose of this disclosure I illustrate a sliding gear 11 adapted to slide on shaft 12. I have shown this a square shaft but it may be a splined shaft.

Within the hub of the gear one or more holes 13 are drilled to a limit as at 14, which is for the purpose of permitting a certain amount of protrusion of the ball 15 beyond the surface 16 of the bore 17 of the gear 11.

This ball is held in extended position by the spring 18 and is held within the hole 13 by the retainer 19 being press fitted in the hole 13. By referring to Figure 1 the two balls 15 shown in the upper half of the drawing are shown extended. When the shaft 12 is in the bore 17 these balls 15 retreat into the holes 13 and are held in forced contact with the shaft 12 by the spring 18.

In Figure 3 I show a modified form of poppet. In this case the holes 13 are through holes. The poppet 40 comprises a semi-spherical member with a stem 41 adapted on its end to engage a plunger retainer 42 which fits into a counter bore 43. A spring 18 as before keeps the poppet in forced contact with the shaft.

In the construction shown with the poppets located off the center line of the spline, the effect is to produce a force which constantly winds the gear upon the spline. This force acts in the direction of rotation of the gear assembly, and forces the gear in tight contact with the spline and thereby produces a positive resisting force acting against torsional vibration.

While I have illustrated four poppets in the drawings, it must be understood that I do not intend to limit myself to that number even with a square shaft and when a splined shaft is used the number of poppets and their distribution may be varied accordingly.

I wish it distinctly understood that my sliding gear assembly herein illustrated and described is in the form in which I desire to construct it but that changes or variations may be made as may be convenient or desirable without departing from the salient features of my invention and I therefore intend the following claims to cover such modifications as naturally fall within the lines of invention.

I claim:

1. In a sliding gear assembly, in combination, a shaft, a gear mounted to freely slide on the shaft, poppets within the gear in constant forced contact with the shaft whereby said poppets being located off the center line of the shaft the line of force of the poppets does not pass through the center line of the shaft.

2. In a sliding gear assembly, in combination, a shaft, a gear mounted to freely slide on the shaft, spring actuated balls within the gear and in constant forced contact with the shaft whereby said balls contacting with the shaft off its center line the line of force of the spring actuated balls does not pass through the center line of the shaft.

In testimony whereof I affix my signature.

CHARLES BEERS SPASE.